Figure 1:
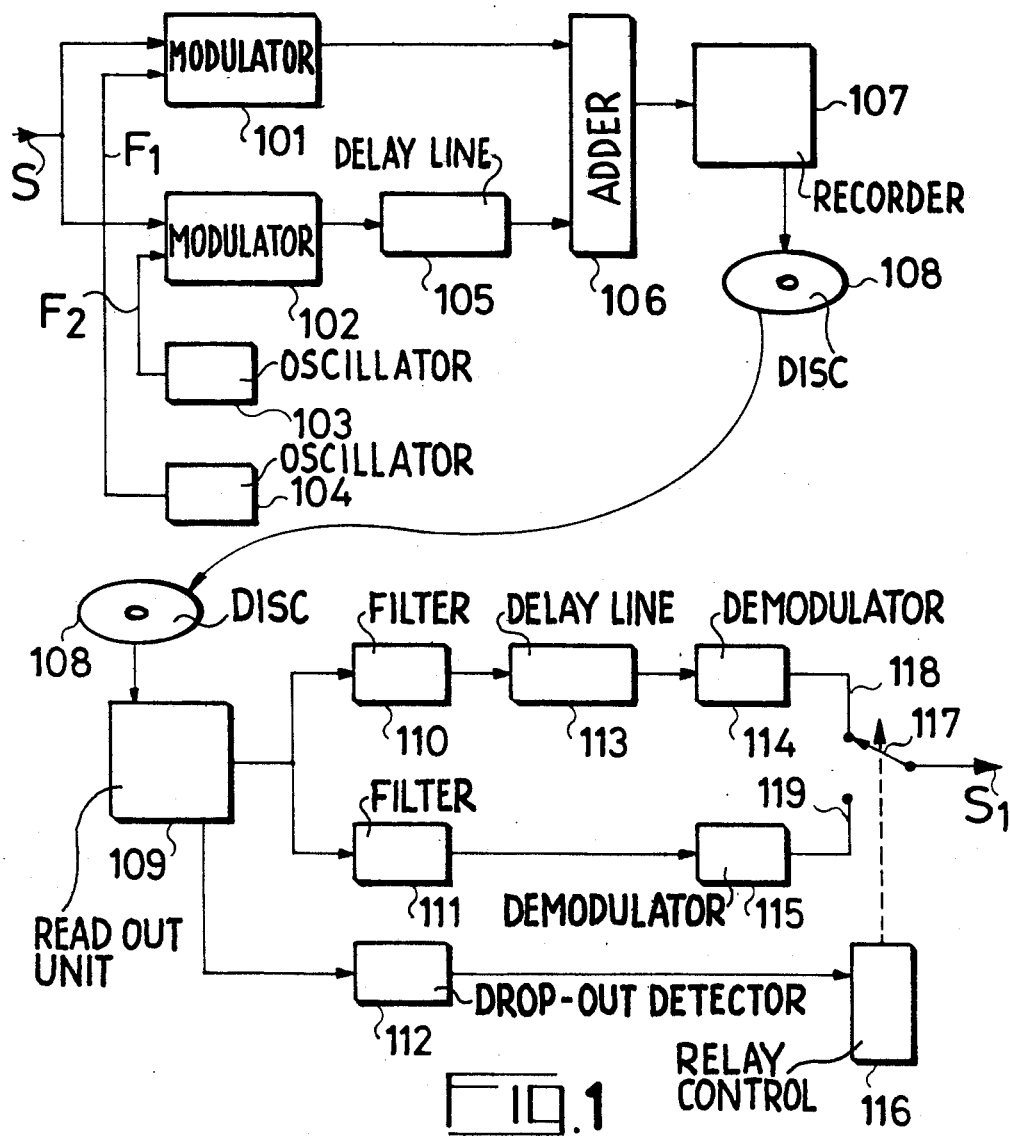

United States Patent [19]
Aigrain et al.

[11] 4,085,426
[45] Apr. 18, 1978

[54] METHOD FOR PROTECTING AGAINST DROP-OUTS IN A SOUND SIGNAL RECORDED ON A VIDEO-DISC

[75] Inventors: Pierre Aigrain; Georges Broussaud; Jean Paul Peltier; Erich Spitz, all of Paris, France

[73] Assignee: Thomson-Brandt, Paris, France

[21] Appl. No.: 662,688

[22] Filed: Mar. 1, 1976

[30] Foreign Application Priority Data

Mar. 4, 1975 France .................................. 75 06740

[51] Int. Cl.² ............................................. H04N 5/78
[52] U.S. Cl. ...................................................... 360/38
[58] Field of Search ............. 360/38, 36; 178/6.6 DC; 179/100.4 D; 358/8; 325/41; 340/146.1 BE, 146.1 BA

[56] References Cited

U.S. PATENT DOCUMENTS

| | | | |
|---|---|---|---|
| 2,996,576 | 8/1961 | Dolby | 360/38 |
| 3,409,875 | 11/1968 | De Jager et al. | 325/41 X |
| 3,526,837 | 9/1970 | Zegers et al. | 325/41 |
| 3,781,795 | 12/1973 | Zegers | 340/146.1 BE |
| 3,824,620 | 7/1974 | Länger | 360/38 |

FOREIGN PATENT DOCUMENTS

1,202,315   10/1965   Germany ................................ 360/38

*Primary Examiner*—John H. Wolff
*Attorney, Agent, or Firm*—Cushman, Darby & Cushman

[57] ABSTRACT

The present invention relates to methods for protecting against drop-outs in a sound signal recorded on a video-disc. It consists in recording onto a video-disc the same sound signal through the sub-carriers with a constant delay from one to the other. On reading out this video-disc, the two sub-carriers are restored to synchronism and the sub-carrier not altered is chosen for playing the sound signal.

4 Claims, 4 Drawing Figures

METHOD FOR PROTECTING AGAINST DROP-OUTS IN A SOUND SIGNAL RECORDED ON A VIDEO-DISC

The present invention relates to methods of protection against drop-outs and transient disturbances of the kind experienced by signals being transmitted through transmission channels. It relates more particularly to channels utilising recording facilities liable to experience disturbances of this kind which are referred to as "drop-out," these disturbances being encountered in particular in the context of magnetic tape or video disc recordings.

It is well known within the context of radio relay links, to transmit the same modulation by the simultaneous use of several channels which differ from one another by at least one parameter (antenna polarisation or carrier frequency for example). A simple measure, generally on the level of the carrier, makes it possible at the receiving end to identify the channel which has been affected during transmission, in particular by drop-outs. These phenomena of drop-out (although due to different causes) are encountered in numerous recording processes in particular in the case of recordings on magnetic tape or video disc. We will use the term video disc to describe the kinds of recording at present under development, which make it possible to record on a disc signals of video frequency which may for example be television signals. This name will be used independently of the content of the recording. Methods of compensating for these drop-outs have been developed. In the case of video disc recordings, use is made of the fact that thus far such a disc has only been employed to carry television programme recordings. Under these circumstances, the redundancy between two successive lines of one and the same field is very large, and virtually the whole of the drop-outs have a duration of less than a line. Thus, the video signal is delayed by a duration equal to the line duration so that at any instant there is available both the video signal representing the line point currently being read out by the pick-up head, and the delayed video signal representing the same point in the preceding line. In the event of drop-out in the line currently being read out, a device detecting these temporary disturbances switches (at least during the time of the drop-out) the remainder of the pick-up circuit to the delayed video signal. This kind of drop-out is detected by the sudden drop in the level of the main sub-carrier recorded on the video disc; to this end, the level of this carrier is permanently measured and compared with a predetermined threshold. In the case of colour television standards utilising sequential transmission of the chrominance signals (such as SECAM or PAL) it is necessary to utilise the second line preceding the line currently being read out, but the principle of the method is exactly the same. Preferably, in order to delay the video signal, the delay line conventionally employed in television receivers operating in accordance with the PAL or SECAM systems, will be used. This method is only applied to the video part of the read out signal, because the audio signal exhibits neither redundancy nor correlation from one line to the next although this is of minor importance in the present instance since the attention of the viewer is concentrated upon the picture and the variations in the sound are located at the top end of the spectrum which is frequently sacrificed in television, in particular due to the risk of interference with the line frequency.

The large capacity of the video disc can be exploited in order to record sound programmes of very long duration or very high quality, or even ones having both these characteristics at the same time albeit to a lesser degree. To do this, several sub-carriers are used which each carry a separate programme or one of its component parts. In order to achieve stereophonic, quadrophonic or, more generally, polyphonic effects, these sub-carriers can be grouped in sets of two, four or n. By utilising frequency modulation of very wide sweep, a very wide pass-band and an excellent signal-to-noise ratio can be achieved. The main carrier directly recorded on the video disc has a pass-band which is limited at the present state of the art to around 10 MHz so that the wider the sweep of the sub-carriers the more it is necessary to reduce their numbers, and this makes clear the choice between duration and quality. Whatever the case, even with relatively long programmes the pass-band and the signal-to-noise ratio remain excellent. It is therefore necessary that the other characteristics should be in harmony with these latter, in order to provide uniform quality. In particular, imperfections due to the recording technology, should not give rise to drop-outs producing a noise level higher than that due to the modulation process.

In accordance with the present invention it is provided a method for protecting against drop-outs an information signal transmitted on a transmission channel, which comprises the steps of:

modulating a first sub-carrier with said information signal for providing a first modulated sub-carrier;

modulating a second sub-carrier with said information signal for providing a second modulated sub-carrier;

delaying said second modulated sub-carrier by a delay $\tau$ for providing a delayed modulated sub-carrier; said delay being longer than the duration of the substantially longest of said drop-outs;

transmitting said firt modulated sub-carrier and said delayed modulated sub-carrier on said transmission channel for providing a first transmitted sub-carrier and a second transmitted sub-carrier; said first transmitted sub-carrier and second transmitted sub-carrier being aleatorily altered by said drop-outs during transmission;

demodulating said first transmitted sub-carrier for providing a first transmitted signal;

demodulating said second transmitted sub-carrier for providing a second transmitted signal;

delaying said first transmitted signal by said delay $\tau$ for providing a delayed transmitted signal; and monitoring said transmission on said transmission channel for detecting said drop-outs, selecting the one of said first transmitted signal and of said delayed transmitted signal that has not been altered by said drop-outs, and providing a selected signal having a fixed level.

Figure 2:
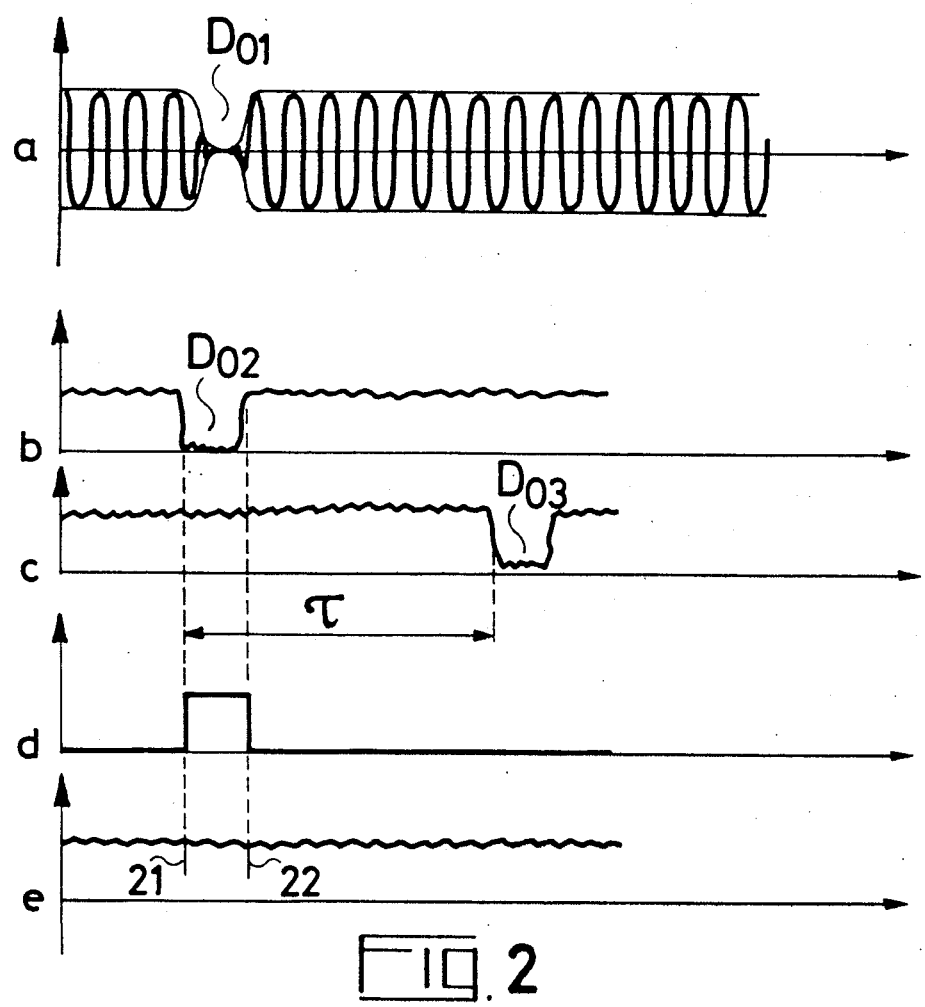
Figure 3:
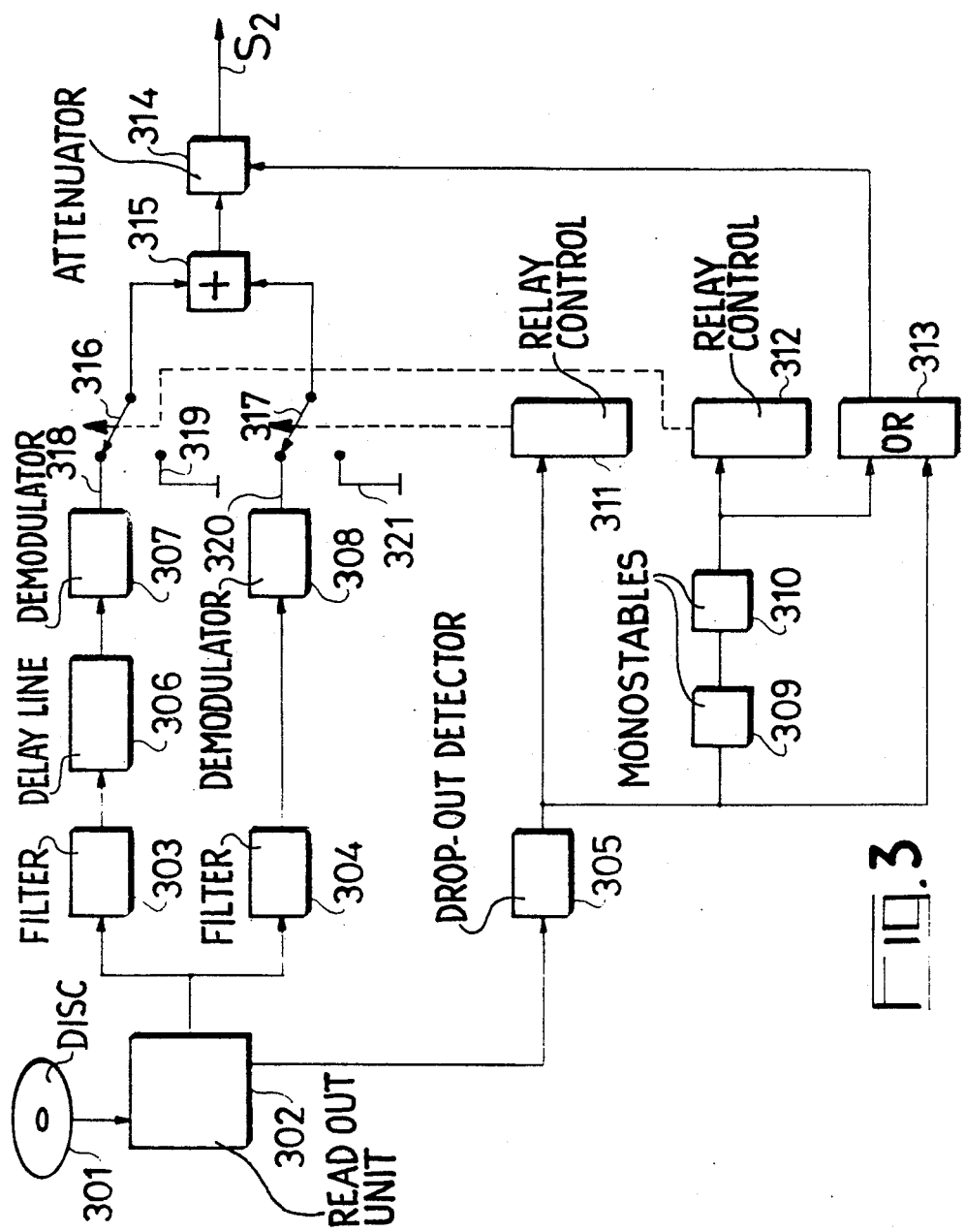
Figure 4:
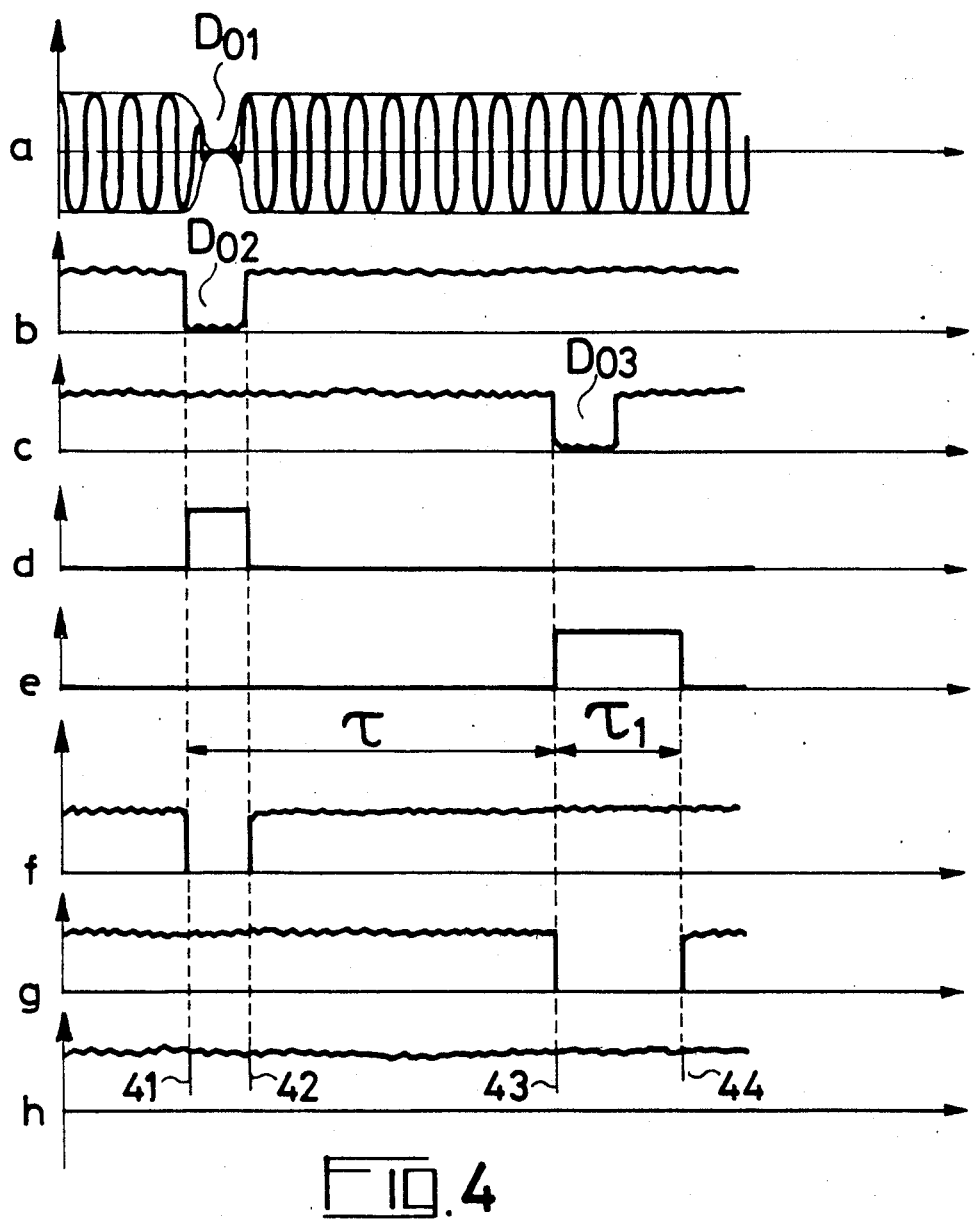

For a better understanding of the invention, and to show how the same may be carried into effect, reference will be made to the ensuing description and the attached figures among which:

FIG. 1 illustrates a video-disc broadcasting system;

FIG. 2, consisting of a through e, illustrates a timing diagram pertaining to the operation of the system shown in FIG. 1;

FIG. 3 illustrates a variant embodiment of the pick-up apparatus of the system shown in FIG. 1;

FIG. 4, consisting of a through h, illustrates a timing diagram pertaining to the operating of the apparatus shown in FIG. 3.

The sound programme broadcasting system shown in FIG. 1, comprises two oscillators 103 and 104 for generating subcarriers, two modulators 101 and 102, a delay line 105, an adder 106, a video disc recorder 107. The video disc 108 is read out using a pick-up system 109 which is followed by two filters 110 and 111, by a delay line 113, by two demodulators 114 and 115, by a fading detector 112, by a relay control 116 and by a relay 117 which switches the paths 118 and 119.

The audio signal S in the modulator 101 modulates a subcarrier $F_1$ coming from the oscillator 104 and in the modulator 102 a sub-carrier $F_2$ coming from the oscillator 103. The modulated sub-carrier $F_2$ is delayed by a time $\tau$ in the delay line 105. $F_2$, after modulation and delay, is then added to $F_1$ which is modulated in the adder 106 and the composite signal is fed to a video disc recorder 107 which produces a video disc 108. This video disc 108 is then read-out by means of a pick-up 109 which reconstitutes the composite signal comprising the two modulated sub-carriers $F_1$ and $F_2$ as we have seen earlier on. This composite signal passes through the filter 110 which extracts $F_1$ and through the filter 111 which extracts $F_2$. $F_1$ is delayed, in the delay line 113, by the same amount of time by which $F_2$ was delayed prior to recording. $F_1$ is then demodulated in the demodulator 114 and $F_2$ likewise in the demodulator 115. Thus, the audio signal is synchronously available in the paths 118 and 119. The relay 117, in the normal way selects the audio signal from the path 118 and supplies it to the output $S_1$. The drop-outs detector 112 permanently monitors the level of the main carrier and compares it with a given threshold. The threshold is at a relatively low level, well below the level of the current read out fluctuations; in other words, severe drop-out is manifested by a very large and sudden drop in the level of the main carrier and often even by its complete disappearance. It can even be arranged for the detector to operate on the composite signal because this also drops severely despite the presence of corrector device (amplification and tripping used prior to demodulation of the main carrier). When the detector 112 detects a drop-out, it actuates the control 116 for the relay 117. The relay changes state and selects the path 119. When the drop-out has passed, the detector 112 releases the control 116 and the relay 117 changes state again and reselects the path 118. The relay 117 has been illustrated schematically to simplify description, but it could be replaced by any other kind of switch and in particular by an electronic switch.

The timing diagram corresponding to the correction of drop-out, is shown in FIG. 2. At $a$ there can be seen the main carrier which is experiencing drop-out $DO_1$. At $b$, there can be seen the demodulated signal at $F_2$, with the effect of drop-out at $DO_2$, and at $c$ there can be seen the demodulated signal at $F_1$ showing the effect of drop-out at $DO_3$. Because of the delay introduced by the delay line 113, $DO_3$ is located at a time $\tau$ after $DO_2$. At $d$ there can be seen the control voltage supplied by the detector 112 during the drop-out, and at $e$ the output audio signal at $S_1$, 21 and 22 illustrating two switching points shown here in a highly exaggerated fashion in order to make them clear. These modulations points are in fact virtually inaudible and are strongly weaker than the drop-out.

The delay $\tau$ should be longer than the duration of the drop-outs. It should not be too close to a whole number multiple of the duration of a revolution of the disc because the drop-outs arise in particular from scratches which, even though not radial, alter contiguous track elements with a periodicity very close to that of a disc revolution. It has been found experimentally that the duration of drop-outs is always very short and in any case substantially less than the duration of a television signal line (namely 64 microseconds in the case of a 625 line standard). However, one of the reasons for using a video disc in order to record sound programmes, is to make available the same kind of equipment for reproducing both television programmes and sound programmes. It is then particularly interesting to try to use the delay line which is already included in the video pick-up device to compensate for the drop-outs in the television signals.

In the special case in which several different programmes have been recorded on the video disc utilising several sets of sub-carriers, the above description also applies whether there are used as many sub-carrier processing circuits as there are sets which are used, or whether, more simply, a frequency conversion is performed in respect of each set, this conversion being designed bring all sets of sub-carriers to the same frequencies, in order to the able to utilise a single signal processing circuit.

The method in accordance with the invention can also be utilised in applications of the video-disc for television programmes. In this case, we have ordinary compensation of the drop-outs in the video signal, which cannot operate as far as the audio signal is concerned since the latter is without redundancy from one line to the next of the picture, and in order to record and reproduce the sound two sub-carriers modulated in the manner described earlier are used. It is then more often than not necessary to utilise for the audio signal a delay line other than that utilised for the video signal by reason of the difficulties encountered in obtaining a delay line which has a sufficiently wide pass-band to pass both the video signal and the audio signal. Whatever the case, the drop-out detector used for the video signal can be used for the audio signal as well since the drop-out occurs in the main carrier.

A variant embodiment of the method in accordance with the invention consists in adding, outside the drop-out, the signals coming from the direct path and the delayed path (or paths) after synchronism has been restored. Thus, by using two paths, it is possible to gain as much as 3dB in the signal-to-noise ratio in the situation (which is the most general one) where the noise is not time-correlated between the paths. In the case where the noise is correlated, it is generally in a known way (line power supply residuals for example) and it is then possible to choose the delay between the two paths in order to minimise the noise factor by placing the two noise signals in antiphase.

A video disc pick-up system utilising this variant embodiment has been shown in FIG. 3. The recording stage is the same as that already described and we will therefore limit ourselves to a description of the reproduction stage. The system comprises a video disc 301 read out by a pick-up device 302 followed by two filters 303 and 304, a delay line 306, two demodulators 307 and 308, a drop-out detector 305, two monostable multivibrators 309 and 310, an OR-gate 313, a relay 316 operated by a control 312 and switching the path 318 and the earth 319, a relay 317 operated by a control 311 and switching the path 320 and the earth 321 an amplifier-adder 315 and an attenuator 314.

The video disc 301 is read out by the pick-up device 302 which restores the composite signal containing the two carriers $F_1$ and $F_2$ modulated in the same manner as before. This composite signal is injected into the filter 303 which extracts $F_1$, and into the filter 304 which extracts $F_2$, $F_1$ is delayed in the delay line 306 by the same duration $\tau$ by which $F_2$ was delayed prior to recording. $F_1$ is then demodulated in the demodulator 307 and $F_2$ in the demodulator 308. The audio signal is thus available synchronously in the paths 318 and 320. Outside the drop-outs, the relay 316 connects the path 318, and the relay 317 the path 320, to the amplifier-adder 15. When the drop-outs detector 305 detects a drop-out it operates the control 311 for the relay 317. This relay changes state and earths the amplifier-adder 315 during the time of the drop-out. At the same time, the detector 305 triggers the monostable 309. The latter operates for a time $\tau$ equal to the aforedescribed time $\tau$ and then, at the end of that time, triggers the monostable 310 which operates during a time $\tau_1$ in accordance with which it actuates the control 312 for the relay 316. This relay changes state and earths 319 the amplifier-adder 315 during the time $\tau_1$. The OR-gate 313 is supplied with the signals from the detector 305 and the monostable 310, and operates the attenuator 314. This attenuator attenuates the audio signal coming from the amplifier 315 by a factor of 2 outside the drop-outs. In the presence of a drop-out, the amplifier 315 only receives every other signal, its output level being divided by two (to the extent that symmetry between the two modulating demodulating circuits is respected) and the attenuators cease to attenuate so that the level of the output signal $S_2$ remains constant.

The timing diagram corresponding to the correction of a severe drop-out, is shown in FIG. 4. At $a$ there can be seen a main carrier wich is experiencing drop-out DO1. At $b$ there can be seen the demodulated signal $F_2$, with the effect of the fading at DO2, and at $c$ there can be seen the demodulated signal at $F_1$ with the effect of the fading at DO3. Because of the delay introduced by the delay line 306, DO3 is at an interval $\tau$ from DO2. At $d$ there can be seen the control voltage supplied by the detector 305 during drop-out and at $e$ there can be seen the control voltage supplied by the monostable trigger stage 310 during a time $\tau_1$ which commences a time $\tau$ after the start of the drop-out. At $f$ there can be seen the audio signal applied to the relay 317, at $g$ the audio signal applied to the relay 316 and at $h$ the audio signal applied to the output $S_2$, whilst 41, 42, 43 and 44 mark the switching points which have been illustrated in a highly exaggerated manner in order to render them visible.

The above description assumes that the monostable 309 can supply a signal of any precise duration $\tau$. It is a good idea to adopt a time $\tau$ which is slightly shorter than $\tau$ so that as a function of all the tolerances and different effects, there is certainty at all times that the demodulated signal at $F_1$ will be disconnected before the beginning of drop-out. At the same time $\tau_1$ will be made longer than the longest possible drop-out.

What we claim is:

1. A method for protecting against drop-outs in a sound signal recorded on a video-disc, which comprises the step of:
    simultaneously modulating a first and a second sub-carrier signal with said sound signal for providing a first and a second modulated sub-carrier signal;
    delaying said second modulated sub-carrier signal by a delay '$\tau$' for providing a delayed modulated sub-carrier signal, said delay being longer than the duration of the substantially longest of said drop-outs;
    recording said first modulated sub-carrier signal and said delayed second modulated sub-carrier signal onto a video-disc;
    reading out said video-disc for simultaneously providing the first and the second modulated sub-carrier signal; said first and second sub-carrier signals being typically subject to simultaneous and random distortion by said drop-outs;
    delaying said first modulated sub-carrier signal by said delay '$\tau$' for providing a delayed read and modulated sub-carrier signal;
    simultaneously demodulating said second read sub-carrier signal and said first delayed and read sub-carrier signal for providing first and second read signals; and
    monitoring said reading out for detecting said drop-outs and substituting said first read signal for said second read signal when said drop-outs occur.

2. A method as claimed in claim 1, wherein said first read signal and said second read signal are added when said monitoring performs no detection of said drop-outs; the level of the sum of said first and second read signals being divided by a factor 2.

3. A method as claimed in claim 1, wherein said delay $\tau$ has a value equal to the duration of $n$ lines in a television raster; $n$ being an integer.

4. An apparatus for reading out a sound signal twice recorded with a first and second signal, the second signal having a fixed delay with respect to the first signal from a video-disc, and correcting the effects of drop-outs occurring during said reading out, said apparatus comprising:
    reading means for reading out said video-disc and thus providing a composite signal;
    means for pulling out from said composite signal a first and a second read sub-carrier signal;
    means for delaying according to said fixed delay said first read sub-carrier signal and thus providing a delayed read sub-carrier signal;
    means for demodulating said delayed first read sub-carrier signal and said second read sub-carrier signals thereby providing a first and a second sound signal;
    means for detecting said drop-outs, so as to provide control signals;
    means for switching off, when said drop-outs occur, successively said second and first sound signals under the control of said control signals so as to provide two selected sound signals;
    means for adding said selected sound signals providing thereby a composite sound signal; and
    an attenuator for dividing by a factor of 2 the level of said composite sound signal under the control of said control signals when said first and second sound signals are not switched off when no drop-out is detected.

* * * * *